(12) United States Patent
Chen et al.

(10) Patent No.: US 8,556,545 B2
(45) Date of Patent: Oct. 15, 2013

(54) CUTTING TOOL HAVING AN ADJUSTMENT MECHANISM

(75) Inventors: Danny Chen, Nahariya (IL); Alexander Orlov, Nahariya (IL)

(73) Assignee: Iscar, Ltd., Tefen (IL)

( * ) Notice: Subject to any disclaimer, the term of this patent is extended or adjusted under 35 U.S.C. 154(b) by 945 days.

(21) Appl. No.: 12/688,601

(22) Filed: Jan. 15, 2010

(65) Prior Publication Data

US 2010/0215445 A1 Aug. 26, 2010

(30) Foreign Application Priority Data

Feb. 24, 2009 (IL) .......................................... 197205

(51) Int. Cl.
*B23C 5/24* (2006.01)
(52) U.S. Cl.
CPC ........................................ *B23C 5/24* (2013.01)
USPC ............................................... 407/36; 407/44
(58) Field of Classification Search
USPC ..................... 407/36, 37, 38, 39, 85, 86, 87
IPC ........................................ B23C 5/20,5/22, 5/24
See application file for complete search history.

(56) References Cited

U.S. PATENT DOCUMENTS

| | | | |
|---|---|---|---|
| 2,229,112 A | 1/1941 | Miller et al. | |
| 6,056,484 A * | 5/2000 | Mitchell et al. | 407/36 |
| 6,511,264 B2 * | 1/2003 | Ripley | 407/36 |
| 6,692,198 B2 | 2/2004 | Kress | |
| 8,197,161 B2 * | 6/2012 | Strom | 407/87 |
| 2002/0081168 A1 | 6/2002 | Kress | |
| 2006/0140730 A1 * | 6/2006 | Schlagenhauf et al. | 407/37 |
| 2009/0010722 A1 | 1/2009 | Chang | |
| 2009/0148245 A1 * | 6/2009 | Choi et al. | 407/36 |
| 2009/0175693 A1 * | 7/2009 | Jansson | 407/37 |

FOREIGN PATENT DOCUMENTS

| | | |
|---|---|---|
| DE | 20 2006 017881 | 3/2008 |
| FR | 95 385 E | 9/1970 |
| WO | 2008/058524 | 5/2008 |

OTHER PUBLICATIONS

English machine translation of FR 95385.*
International Search Report in PCT/IL2010/000061 dated May 28, 2010.

* cited by examiner

*Primary Examiner* — Daniel Howell
*Assistant Examiner* — Alan Snyder
(74) *Attorney, Agent, or Firm* — Womble Carlyle

(57) ABSTRACT

A cutting tool has a tool body provided with at least one insert pocket in which a cutting insert is retained. A device for adjusting a position of the cutting insert within the insert pocket is also provided. A cavity adjacent the insert pocket accommodates an adjustment wedge having a forward surface in sliding contact with a minor side surface of the cutting insert and an adjustment screw threadingly engaged with a female threaded section of the adjustment wedge. The adjustment screw is constrained to remain in its position in the cavity, although rotation of the adjustment screw about its axis results in a sliding motion of the adjustment wedge relative to the cavity and a sliding motion of the forward surface relative to the minor side surface, which translates to displacement of the cutting insert in a direction parallel to a base surface of the insert pocket.

19 Claims, 4 Drawing Sheets

CUTTING TOOL HAVING AN ADJUSTMENT MECHANISM

FIELD OF THE INVENTION

The present invention relates to a cutting tool having adjustment means for adjusting a position of a cutting insert therein.

BACKGROUND OF THE INVENTION

Some cutting tools, e.g., milling tools, slotting tools, reaming tools and other cutting tools include multiple indexable cutting inserts, releasably retained in one or more respective insert pockets formed in the cutting tool. Indexable cutting inserts may be indexed and/or replaced, e.g., upon wearing thereof.

However, various imperfections occur during the manufacture of indexable cutting inserts and/or the retaining insert pockets. Additionally, various inaccuracies are involved in the operation of securing the cutting inserts in their respective positions. Thereby, multiple cutting inserts secured in a cutting tool may protrude to different extents with respect to a given reference plane. This may result in axial and/or radial run out so that the cutting tool may have a distorted, or a non-well defined cutting plane, rendering the cutting tool inappropriate, for example, for performing high-finish cutting operations.

U.S. Pat. No. 6,692,198 discloses a tool for fine machining of workpieces, where an adjusting element accommodated in a recess in a base body of the tool bears against a cutting tip fastened to the base body, providing a means for finely adjusting the position of a cutting edge of the cutting tip. The adjusting element is displaceable relative to the cutting tip by a set screw having two opposite handed threaded regions interfacing with respectively threaded holes in the adjustment element and the base body. Rotation of the set screw displaces the adjusting element, which in turn displaces the cutting tip by virtue of the adjusting element having an adjusting surface inclined relative to a horizontal center plane and bearing against an equally inclined side surface of the cutting tip. The requirement for the set screw to extend beyond the recess into the threaded hole of the base body may introduce restrictions with respect to the minimum size of tool within which the adjusting element can be integrated.

SUMMARY OF THE INVENTION

In accordance with some embodiments of the present invention, there is provided a cutting tool comprising:

a tool body having at least one insert pocket provided with a generally planar base surface;

a cutting insert releasably retained in the insert pocket and supported by the generally planar base surface, the cutting insert comprising a peripheral side surface, the peripheral side surface comprising a minor side surface;

an adjustment screw positioned in a cavity formed adjacent the insert pocket, the adjustment screw capable of rotating about an adjustment screw rotation axis thereof;

an adjustment wedge, accommodated in the cavity, the adjustment wedge comprising a female threaded section configured to threadingly engage a male threaded section of the adjustment screw;

wherein rotation of the adjustment screw in a given direction results in an inclined sliding motion of the adjustment wedge relative to the minor side surface of the cutting insert;

wherein by virtue of the sliding motion, the adjustment wedge is capable of displacing the cutting insert along an adjustment axis parallel to the base surface; and wherein the adjustment screw is constrained to maintain its position in the cavity.

In accordance with some embodiments of the invention, there is provided a cutting tool comprising a tool body, an adjustment screw and an adjustment wedge. The tool body has at least one insert pocket provided with a base surface, and a cavity adjacent the insert pocket. The cavity comprises an upper groove, a lower surface and a lower groove comprising an undercut between the upper groove and the lower surface. The adjustment screw has a male threaded section and a screw head and is capable of rotating about its adjustment screw rotation axis. The adjustment wedge comprises a female threaded section. A portion of the adjustment screw's screw head is configured to be accommodated in the lower groove. The adjustment wedge is configured to be accommodated in the cavity. Finally, the adjustment screw's male threaded section is configured to threadingly engage the adjustment wedge's female threaded section, when said portion of the adjustment screw's screw head is accommodated in the lower groove and the adjustment wedge is accommodated in the cavity.

BRIEF DESCRIPTION OF THE DRAWINGS

For a better understanding of the present invention and to show how the same may be carried out in practice, reference will now be made to the accompanying drawings in which broken lines represent cut-off boundaries for partial views of a member, and in which.

Figure 1:
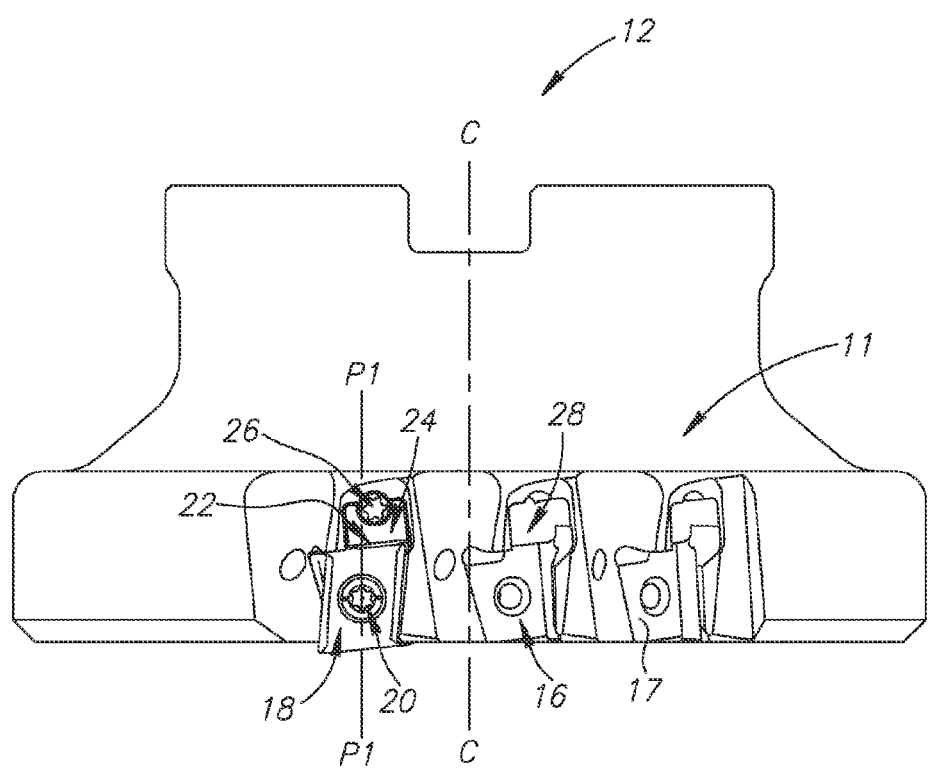
FIG. 1 is a perspective view of a cutting tool, in accordance with some embodiments of the invention.
Figure 2:
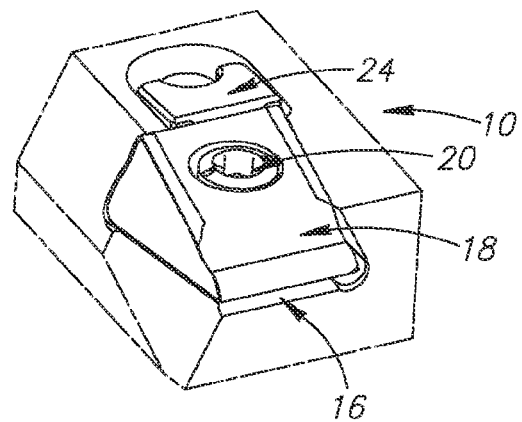
FIG. 2 is a perspective view of a cutting portion of a cutting tool, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Thereby, for example, in accordance with the above paragraph, although some drawings herein show one or more portions of a milling tool, the present invention is not limited in this respect. For example, embodiments of the invention may refer to, or be implemented in other cutting tools, e.g., turning tools, grooving tools, parting tools, or other metal cutting tools having one or more cutting inserts releasably retained therein.

Additionally, although some drawings herein show a cutting insert having a specific shape, the present invention is not limited in this respect. For example, embodiments of the invention may refer to adjustment mechanisms suitable for adjusting cutting inserts having various other shapes, for example, rhombic, triangular, square, rectangular, or different parallelogramic shapes, other polygonal shapes, or the like.

Reference is made to FIGS. 1 to 4, showing a cutting tool 12 and a cutting portion 10 formed in a tool body 11 of the cutting tool 12, in accordance with some embodiments.

In some embodiments, the cutting portion 10 includes an insert pocket 16 having an indexable cutting insert 18, retained therein, releasably secured in the insert pocket 16 by means of a clamping screw 20 and a cavity 28 adjacent the insert pocket 16 accommodating an adjustment wedge 24 and an adjustment screw 26. In some embodiments, the clamping screw 20 may have a screw axis S substantially perpendicular to a planar base surface 17 of the insert pocket 16. The cutting insert 18 may be a tangential type cutting insert including a peripheral side surface 14, the peripheral side surface 14 including a major side surface 21 supported by the base surface 17 of the insert pocket 16 and a minor side surface 22 adjacent the cavity 28 in sliding contact with a forward surface 62 of the adjustment wedge 24.

A first plane P1 extends transversely to the minor side surface 22 of the cutting insert 18 and perpendicular to the base surface 17 of the insert pocket 16 where for some embodiments, as shown in FIG. 1, the first plane P1 is parallel to a central axis C of the cutting tool 12. Other embodiments may include a radial type cutting insert with the first plane P1 perpendicular to the central axis C. It is understood that such a first plane P1 is defined for each insert pocket in cutting tool 12.

Reference is made to FIGS. 2 to 7, showing views, elements, components and cross-sections of the cutting portion 10, in accordance with some embodiments.

In some embodiments, e.g., as shown in FIGS. 4 to 7, the adjustment wedge 24 includes a female threaded section 48, to threadingly receive therein a male threaded section 30 of the adjustment screw 26, to adjust, e.g. to displace the cutting insert 18, along an adjustment axis A which is parallel to the base surface 17 of the insert pocket 16 and forms a first acute angle α with the first plane P1, as described in detail below.

Figure 7:
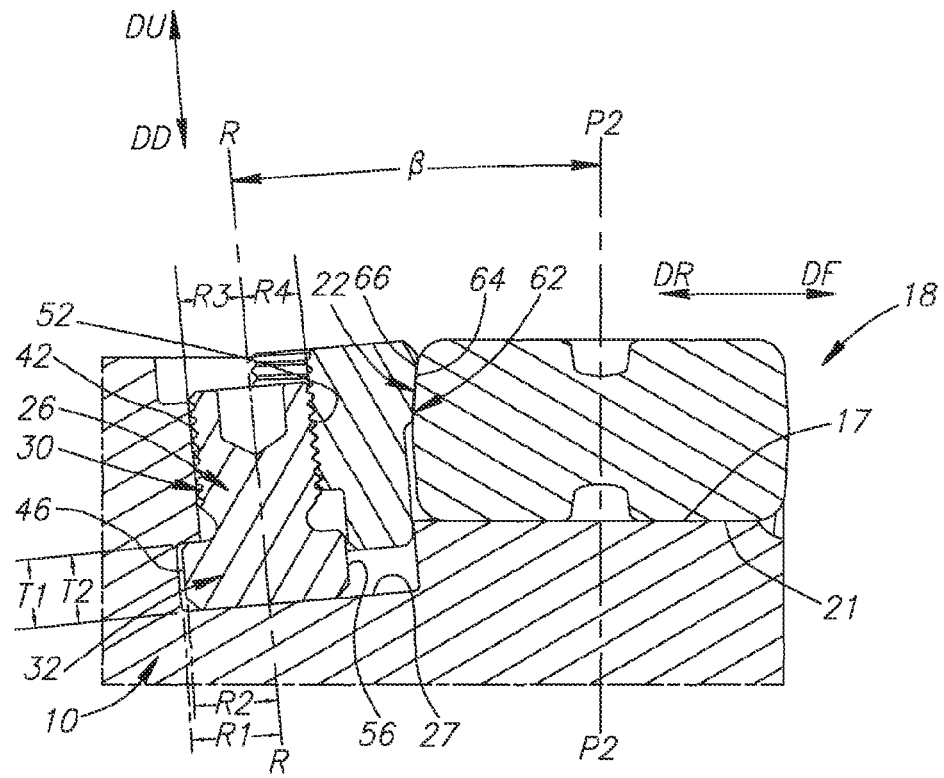
FIG. 7 is a cross section view of the cutting portion shown in FIG. 4, taken along the line VII-VII, in accordance with some embodiments of the invention.

In some embodiments as shown in FIG. 7, the adjustment screw 26 includes a cylindrical shaped screw head 32 co-axial with the male threaded section 30 and supported by a lower surface 27 of the cavity 28. The screw head 32 is partially accommodated in a lower groove 44 in a front wall 40 of the cavity 28 adjacent the lower surface 27, where a rearwardly facing head portion 46 of the screw head 32 interfaces with the lower groove 44. The lower groove 44 may be non-threaded and partially cylindrical in shape having a first radius R1 at least the same as a second radius R2 of the screw head 32.

The male threaded section 30 of the adjustment screw 26 is partially accommodated in a non-threaded upper groove 38 in the front wall 40 of the cavity 28, where a rearwardly facing threaded portion 42 of the male threaded section 30 interfaces with the upper groove 38. The upper groove 38 may be partially cylindrical in shape and coaxial with the lower groove 44, having a third radius R3 corresponding to a fourth radius R4 of the male threaded section 30. Translational movement of the adjustment screw 26 away from lower surface 27 of the cavity 28 is prevented due to the second radius R2 of the screw head 32 being greater than the third radius R3 of the upper groove 38 and the lower groove 44 having a first thickness T1 corresponding to a second thickness T2 of the screw head 32. Thus, the lower groove 44 comprises an undercut between the non-threaded upper groove 38 and the lower surface 27 of the cavity 28.

The adjustment screw 26 may include a socket 34, formed in a top surface 36 thereof distal to the screw head 32, to allow insertion of a key therein (not shown), in order to rotate the adjustment screw 26 about an adjustment screw rotation axis R thereof, the adjustment screw rotation axis R forming a second acute angle β with a second plane P2, the second plane P2 being perpendicular to the first plane P1 and the base surface 17 of the insert pocket 16.

Figure 5:
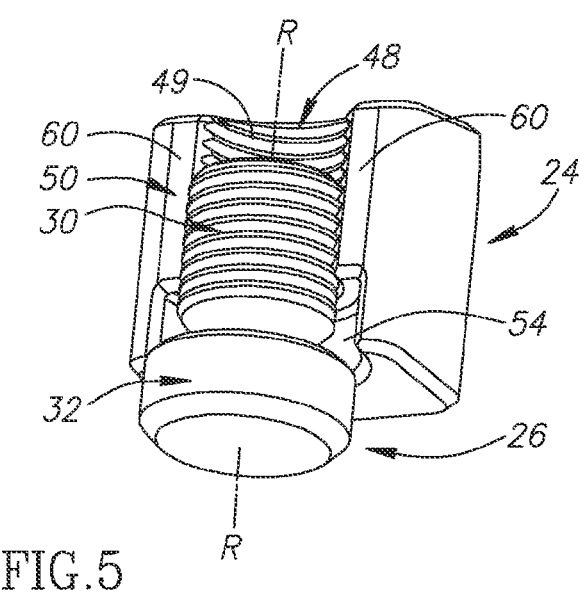
FIG. 5 is a perspective, side view of an adjustment screw and an adjustment wedge of the cutting portion of FIG. 2, in accordance with some embodiments of the invention.

In some embodiments, as shown in FIG. 5, the female threaded section 48 of the adjustment wedge 24 constitutes a partially cylindrical shaped threaded groove 49 formed in a rear surface 50 of the adjustment wedge 24, to threadingly receive therein a forwardly facing threaded portion 52 of the male threaded section 30, which is not accommodated in the upper groove 38. The adjustment wedge 24 may additionally include a partially cylindrical shaped lower recess 54 formed in the rear surface 50 to accommodate therein a forwardly facing head portion 56 of the screw head 32 that is not accommodated in the lower groove 44.

Figure 3:
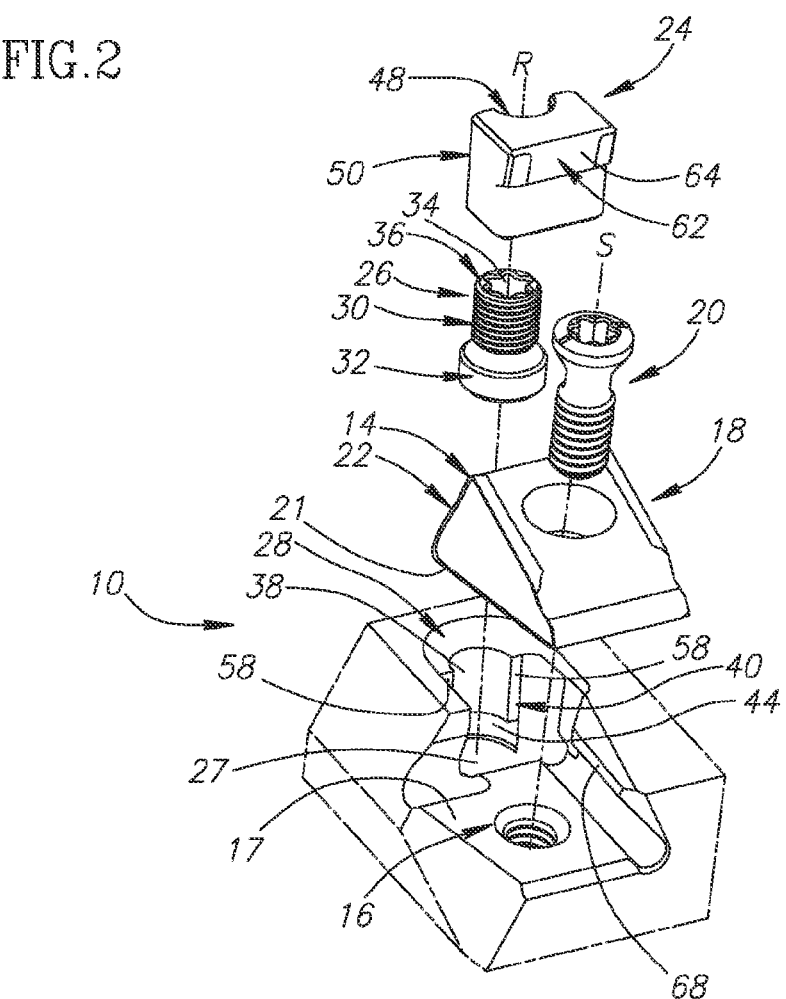
FIG. 3 is a perspective exploded view of the cutting portion of FIG. 2, in accordance with some embodiments of the invention.
Figure 4:
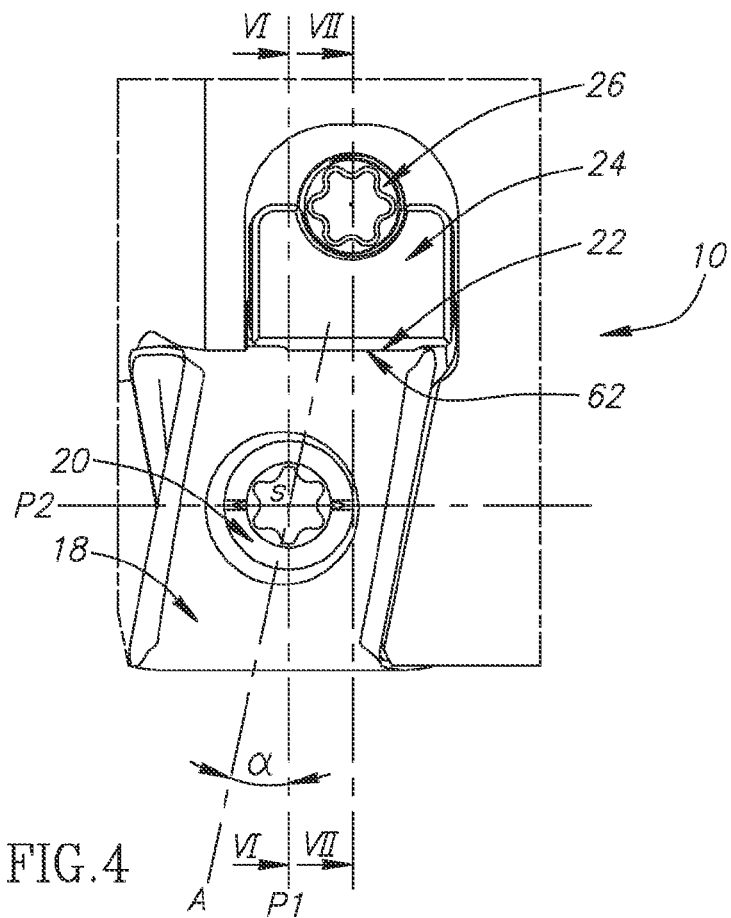
FIG. 4 is a top view of the cutting portion of FIG. 2, in accordance with some embodiments of the invention.
Figure 6:
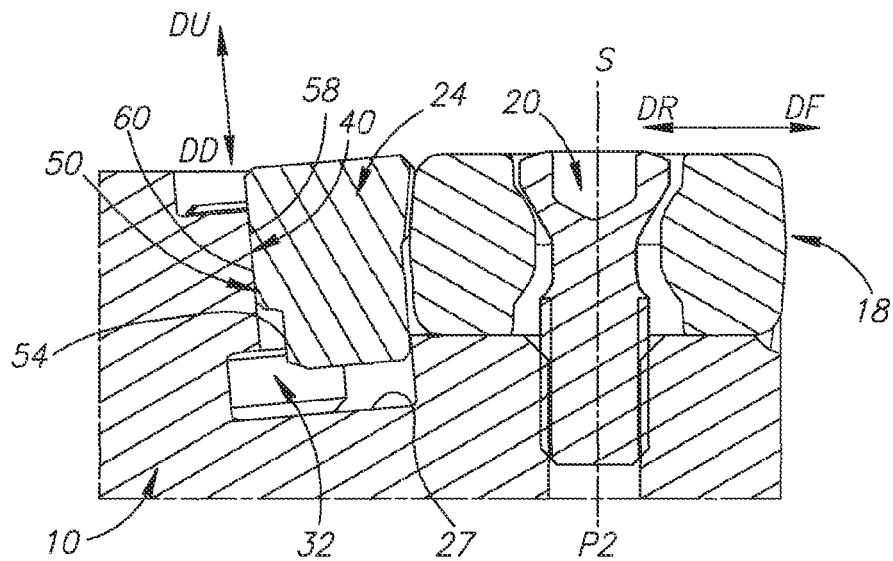
FIG. 6 is a cross section view of the cutting portion shown in FIG. 4, taken along the line VI-VI, in accordance with some embodiments of the invention.

In some embodiments, e.g. as shown in FIGS. 3, 5 and 6, the cavity 28 has two engagement surfaces 58 formed in the front wall 40 thereof, extending substantially parallel to the adjustment screw rotation axis R and in sliding contact with two respective sliding surfaces 60 formed in the rear surface 50 of the adjustment wedge 24. Accordingly, rotation of the adjustment screw 26 in a first direction (for example, in an counter-clockwise direction in a top view, as shown in FIG. 4), results in a sliding motion of the adjustment wedge 24 in a downward direction DD towards the lower surface 17 of the cavity 28, with the adjustment screw 26 being constrained to maintain its position in the cavity 28. As shown in FIG. 7 the sliding motion may be, for example, substantially along an axis parallel to the adjustment screw rotation axis R, therefore said sliding motion has a component perpendicular to the second plane P2 by virtue of the adjustment screw rotation axis R being inclined at the second acute angle β with the second plane P2. In some embodiments, the forward surface 62 of the adjustment wedge 24 has a generally planar single continuous abutment region 64 in sliding contact with a generally planar single continuous abutting region 66 of the minor side surface 22 of the cutting insert 18, where due to the abutment and abutting regions 64, 66 being inclined with respect to the adjustment screw rotation axis R, the sliding motion in the downward direction DD translates into displacement of the cutting insert 18 in a forward direction DF away from the cavity 28. In some embodiments the abutment region 64 may be in sliding contact with several spaced apart abutting regions 66 of the minor side surface 22. In some embodiments the cutting insert 18 may be displaced along the adjustment axis A at the first acute angle α with the first plane P1 due to constraints in the form of a side wall 68 in the insert pocket 16.

In some embodiments, rotation of the adjustment screw 26 in a second direction (for example, in a clockwise direction in a top view, as shown in FIG. 4), results in a sliding motion of the adjustment wedge 24 in an upward direction DU away from the lower surface 17 of the cavity 28, with the adjustment screw 26 being constrained to maintain its position in the cavity 28. The sliding motion has a component perpendicular to the second plane P2, where in a condition that the clamping screw 20 exerts a force on the cutting insert 18 in a rearward direction DR towards the cavity 28, the sliding motion translates into displacement of the cutting insert 18 in the rearward direction DR. In a condition that the clamping screw 20 ceases to exert a force on the cutting insert 18 in the rearward direction DR, the sliding motion initiates separation of the forward surface 62 of the adjustment wedge 24 from the minor side surface 22 of the cutting insert 18.

In some embodiments the second acute angle β may be chosen to be suitably small, e.g. 5°, and the pitch of the male threaded section 30 of the adjustment screw 26 chosen to be suitably fine, e.g. 0.5 mm, such that a single rotation of the adjustment screw 26 equates to a displacement of the cutting insert 18 by approximately 0.04 mm in the forward or rearward direction DF, DR thus allowing the operator to make suitably fine adjustments to the position of the cutting insert 18 with respect to the insert pocket 16 along the adjustment axis A.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool (12), comprising:
   a tool body (11) having at least one insert pocket (16) provided with a generally planar base surface (17);
   a cutting insert (18) releasably retained in the insert pocket (16) and supported by the generally planar base surface (17), the cutting insert (16) comprising a peripheral side surface (14), the peripheral side surface (14) comprising a minor side surface (22);
   an adjustment screw (26) positioned in a cavity (28) formed adjacent the insert pocket (16), the adjustment screw (26) capable of rotating about an adjustment screw rotation axis (R) thereof;
   an adjustment wedge (24), accommodated in the cavity (28), the adjustment wedge (24) comprising a female threaded section (48) configured to threadingly engage a male threaded section (30) of the adjustment screw (26);
   wherein rotation of the adjustment screw (26) in a given direction results in an inclined sliding motion of the adjustment wedge (24) relative to the minor side surface (22) of the cutting insert (18);
   wherein by virtue of the sliding motion, the adjustment wedge (24) is capable of displacing the cutting insert (18) along an adjustment axis (A) parallel to the base surface (17);
   wherein the adjustment screw (26) is constrained to maintain its position in the cavity (28); and
   wherein the adjustment screw (26) includes a screw head (32) supported by a lower surface (27) of the cavity (28) and partially accommodated in a lower groove (44) in a front wall (40) of the cavity (28) adjacent the lower surface (27).

2. The cutting tool (12) according to claim 1, wherein the female threaded section (48) constitutes a threaded groove (49) formed in a rear surface (50) of the adjustment wedge (24).

3. The cutting tool (12) according to claim 1, wherein the cutting insert (18) is releasably retained in the insert pocket (16) by means of a clamping screw (20) having a screw axis (S) substantially perpendicular to the base surface (17).

4. The cutting tool (12) according to claim 1, wherein a forward surface (62) of the adjustment wedge (24) having a generally planar abutment region (64) is in sliding contact with the minor side surface (22) of the cutting insert (18) having a generally planar abutting region (66).

5. The cutting tool (12) according to claim 4, wherein the abutment and abutting regions (64, 66) are inclined with respect to the adjustment screw rotation axis (R).

6. The cutting tool (12) according to claim 1, wherein the front wall (40) of the cavity (28) has two engagement surfaces (58) in sliding contact with two respective sliding surfaces (60) of a rear surface (50) of the adjustment wedge (24).

7. The cutting tool (12) according to claim 6, wherein the two engagement surfaces (58) are parallel to the adjustment screw rotation axis (R).

8. The cutting tool (12) according to claim 1, wherein the lower groove (44) has a first thickness (T1) corresponding to a second thickness (T2) of the screw head (32).

9. The cutting tool (12) according to claim 1, wherein the male threaded section (30) is partially accommodated in an upper groove (38) in the front wall (40) of the cavity (28) having a third radius (R3) corresponding to a fourth radius (R4) of the male threaded section (30).

10. The cutting tool (12) according to claim 9, wherein rearwardly facing and forwardly facing threaded portions (42, 52) of the male threaded section (30) interface with the upper groove (38) of the cavity (28) and the female threaded section (48) of the adjustment wedge (24), respectively.

11. The cutting tool (12) according to claim 9, wherein the screw head (32) has a cylindrical shape with a second radius (R2) greater than the third radius (R3).

12. The cutting tool (12) according to claim 1, wherein the adjustment screw (26) includes a socket (34) formed in a top surface (36) distal to the screw head (32).

13. The cutting tool (12) according to claim 1, wherein the adjustment axis (A) forms a first acute angle (α) with a first plane (P1), the first plane (P1) extending transversely to the minor side surface (22) of the cutting insert (18) and perpendicular to the base surface (17).

14. The cutting tool (12) according to claim 13, wherein the adjustment screw rotation axis (R) forms a second acute angle (13) with a second plane (P2) perpendicular to the first plane (P1) and the base surface (17).

15. The cutting tool (12) according to claim 13, wherein the first plane (P1) is parallel to a central axis (C) of the cutting tool (12).

16. The cutting tool (12) according to claim 1, wherein rotation of the adjustment screw (26) in a counter-clockwise direction in a top view results in displacement of the cutting insert (18) in a forward direction DF away from the cavity (28).

17. A cutting tool (12), comprising:
   a tool body (11) having:
      at least one insert pocket (16) provided with a base surface (17); and a cavity (28) adjacent the insert pocket (16), the cavity (28) comprising an upper groove (38), a lower surface (27) and a lower groove (44) comprising an undercut between the upper groove (38) and the lower surface (27);

an adjustment screw (26) having a male threaded section (30) and a screw head (32), the adjustment screw (26) capable of rotating about an adjustment screw rotation axis (R) thereof; and an adjustment wedge (24) comprising a female threaded section (48);

wherein:

a portion of the adjustment screw's screw head (32) is configured to be accommodated in the lower groove (44);

the adjustment wedge (24) is configured to be accommodated in the cavity (28); and the adjustment screw's male threaded section (30) is configured to threadingly engage the adjustment wedge's female threaded section (48), when said portion of the adjustment screw's screw head (32) is accommodated in the lower groove (44) and the adjustment wedge (24) is accommodated in the cavity (28).

18. The cutting tool (12) according to claim 17, further comprising:

a cutting insert (18) releasably retained in the insert pocket (16) by a clamping screw (20);

wherein:

said portion of the adjustment screw's screw head (32) is accommodated in the lower groove (44);

the adjustment wedge (24) is accommodated in the cavity (28) and is in abutment with a minor side surface (22) of the cutting insert (18);

the adjustment screw's male threaded section (30) is threadingly engaged to the adjustment wedge's female threaded section (48); and rotation of the adjustment screw (26) in a given direction results in an inclined sliding motion of the adjustment wedge (24) relative to the minor side surface (22) of the cutting insert (18), whereby the cutting insert (18) is displaced along an adjustment axis (A) parallel to the base surface (17).

19. The cutting tool (12) according to claim 18, wherein:

the adjustment screw's male threaded section (30) is accommodated between the cavity's upper groove (38) and the adjustment wedge (24).

* * * * *